(12) United States Patent
Shinbata

(10) Patent No.: US 7,447,376 B2
(45) Date of Patent: Nov. 4, 2008

(54) IMAGE PROCESSING APPARATUS, IMAGE PROCESSING METHOD, STORAGE MEDIUM, AND PROGRAM

(75) Inventor: Hiroyuki Shinbata, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/689,871

(22) Filed: Mar. 22, 2007

(65) Prior Publication Data

US 2007/0188785 A1    Aug. 16, 2007

Related U.S. Application Data

(63) Continuation of application No. 11/320,914, filed on Dec. 30, 2005, now Pat. No. 7,248,748, which is a continuation of application No. 10/166,621, filed on Jun. 12, 2002, now Pat. No. 7,076,111, which is a continuation of application No. PCT/JP01/10387, filed on Nov. 28, 2001.

(30) Foreign Application Priority Data

Nov. 30, 2000   (JP) .............................. 2000-365328
Apr. 4, 2001    (JP) .............................. 2001-105846

(51) Int. Cl.
    *G06K 9/40*   (2006.01)
(52) U.S. Cl. ..................... 382/254; 382/274; 369/13.56
(58) Field of Classification Search ................ 382/128, 382/129, 130, 131, 132, 133, 168–169, 172, 382/194, 203, 207, 254, 255, 260, 274, 275, 382/302, 305, 162, 191, 100, 232, 105, 106; 378/105, 106, 62; 358/1.9; 369/13.56; 250/584
See application file for complete search history.

(56) References Cited

U.S. PATENT DOCUMENTS

| | | | |
|---|---|---|---|
| 4,618,990 A * | 10/1986 | Sieb et al. | 382/266 |
| 4,825,297 A | 4/1989 | Fuchsberger et al. | 358/284 |
| 5,012,096 A * | 4/1991 | Takeda et al. | 250/584 |
| 5,220,624 A | 6/1993 | Sakamoto et al. | 382/54 |

(Continued)

FOREIGN PATENT DOCUMENTS

DE    36 29 409 A1    3/1988

(Continued)

OTHER PUBLICATIONS

European Official Communication and Search Report dated Jun. 25, 2007, regarding Application No. 01998180.2—2218 PCT/JP0110388.

(Continued)

*Primary Examiner*—Seyed Azarian
(74) *Attorney, Agent, or Firm*—Fitzpatrick, Cella, Harper & Scinto

(57) ABSTRACT

There are provided an image processing apparatus and method. In this apparatus and method, high-frequency components are converted by multiple-frequency transformation in accordance with tone conversion used to change the dynamic range, thereby obtaining a high-quality image. For example, an original image undergoes tone conversion on the basis of a tone conversion curve, and the converted image then undergoes discrete wavelet transformation. After that, subbands obtained by discrete wavelet transformation undergo a conversion process in correspondence with the slope of the tone conversion curve.

10 Claims, 13 Drawing Sheets

U.S. PATENT DOCUMENTS

| | | | |
|---|---|---|---|
| 5,253,082 A | 10/1993 | Hayashi et al. | 358/1.9 |
| 5,454,044 A | 9/1995 | Nakajima | 382/132 |
| 5,467,404 A * | 11/1995 | Vuylsteke et al. | 382/274 |
| 5,644,662 A * | 7/1997 | Vuylsteke | 382/302 |
| 5,799,112 A * | 8/1998 | de Queiroz et al. | 382/254 |
| 5,930,402 A | 7/1999 | Kim | 382/274 |
| 6,009,208 A * | 12/1999 | Mitra et al. | 382/254 |
| 6,072,913 A * | 6/2000 | Yamada | 382/275 |
| 6,252,931 B1 | 6/2001 | Aach et al. | 378/98.2 |
| 6,813,335 B2 | 11/2004 | Shinbata | 378/62 |
| 7,050,648 B1 | 5/2006 | Shinbata | 382/274 |
| 2003/0016855 A1 | 1/2003 | Shinbata | 382/132 |

FOREIGN PATENT DOCUMENTS

| | | |
|---|---|---|
| EP | 0 827 333 A2 | 3/1998 |
| EP | 0 996 090 A2 | 4/2000 |
| EP | 1 005 223 A2 | 5/2000 |
| JP | 58-182957 | 10/1983 |
| JP | 63-59266 | 3/1988 |
| JP | 3-293864 | 12/1991 |
| JP | 4-284066 | 10/1992 |
| JP | 4-321379 | 11/1992 |
| JP | 06-274614 | 9/1994 |
| JP | 06-274615 | 9/1994 |
| JP | 2509503 | 4/1996 |
| JP | 09-091423 | 4/1997 |
| JP | 2663189 | 6/1997 |
| JP | 9-181940 | 7/1997 |
| JP | 09-212623 | 8/1997 |
| JP | 10-164469 | 6/1998 |
| JP | 10-302052 | 11/1998 |
| JP | 11-041602 | 2/1999 |
| JP | 11-066280 | 3/1999 |
| JP | 11-177819 | 7/1999 |
| JP | 11-272861 | 10/1999 |
| JP | 11-355575 | 12/1999 |
| JP | 12-306089 | 11/2000 |
| JP | 2000-316090 | 11/2000 |
| WO | WO 98/54903 | 12/1998 |

OTHER PUBLICATIONS

European Official Communication and Search Report dated Jul. 5, 2007, regarding Application No. 07075246.4—2218.

M. Stahl, et al., "Noise-Resistant Weak-Structure Enhancement for Digital Radiography", Institute of Imaging and Computer Vision, SPIE vol. 3661, Medical Imaging 99, pp. 1406-1417.

Luo, J., et al., "A Robust Technique for Image Descreening Based on the Wavelet Transform," IEEE Transactions on Signal Processing, IEEE USA, vol. 46, No. 4, Apr. 1998, pp. 1179-1184.

Laine, A., et al., "Enhancement by Multiscale Nonlinear Operators," Handbook of Medical Imaging Processing and Analysis, Academic Press, Oct. 2000, pp. 33-55.

Anan et al., "Proceedings of 45th Annual Meeting," Japanese Journal of Radiological Technology, vol. 45, No. 8, Aug. 1989, p. 1030.

J. Kosanetzky et al., "Energy Resolved X-Ray Diffraction CT," Application of Optical Instrumentation In Medicine, XIV: Medical Imaging, Processing, and Display and Picture Archiving and Communication System (PACS IV) for Medical Applications, Roger H. Schneider, Samuel J. Dwyer III, Editors, Proc. SPIE 626, pp. 137-142, (1986).

Ken Matozaki, "Wavelet Henkan wo mochiita Kyobu X-sen Gazou no Kyocho," Denshi Joho Tsushin Gakkai Ronbunshi D-II, vol. J83-D-II, No. 1, pp. 408-414, Jan. 25, 2000, Japan.

Ohtani, M. et al., *Japanese Journal of Radiological Technology*, vol. 45, No. 8, p. 1030 (Aug. 1989).

* cited by examiner

IMAGE PROCESSING APPARATUS, IMAGE PROCESSING METHOD, STORAGE MEDIUM, AND PROGRAM

CROSS REFERENCE TO RELATED APPLICATIONS

This application is a continuation of U.S. application Ser. No. 11/320,914, filed on Dec. 30, 2005, which is a continuation of U.S. application Ser. No. 10/166,621, filed Jun. 12, 2002, which is a continuation of International Application No. PCT/JP01/10387, filed on Nov. 28, 2001. The entire disclosure of each prior application is incorporated by reference herein.

TECHNICAL FIELD

The present invention relates to an image processing apparatus, image processing method, storage medium, and program and, more particularly, to an image processing apparatus, image processing method, storage medium, and program for changing the dynamic range of image data.

BACKGROUND ART

For example, an X-ray chest image has a very broad range of pixel values since it is made up of an image region of lungs through which X-rays are readily transmitted, and an image region of a mediastinal part through which X-rays are hardly transmitted. For this reason, it has been considered to be difficult to obtain an X-ray chest image that allows to simultaneously observe both the lungs and mediastinal part.

As a method of avoiding this problem, a method described in SPIE Vol. 626 Medicine XIV/PACS IV (1986) is known. This method is described using constants A, B, and C (for example, A=3, B=0.7) by:

$$S_D = A[S_{org} - S_{US}] + B[S_{US}] + C \quad (1)$$

where $S_D$ is the pixel value of an image after processing, $S_{org}$ is the pixel value (input pixel value) of an original image (input image), and $S_{US}$ is the pixel value of a low-frequency image of the original image.

This method can change weighting coefficients for high-frequency components (first term) and low-frequency components (second term). For example, when A=3 and B=0.7, the effect of emphasizing the high-frequency components and compressing the overall dynamic range can be obtained. Five radiologists evaluated that this method is effective for diagnosis compared to an image without any processing.

Japanese Patent No. 2509503 describes a method which is described by:

$$S_D = S_{org} + F[G(Px, Py)] \quad (2)$$

where $S_D$ is the pixel value after processing, $S_{org}$ is the original pixel value (input pixel value), Py is the average profile of a plurality of Y-profiles of an original image, and Px is the average profile of a plurality of X-profiles.

The characteristics of the function F(x) will be explained below. If "x>Dth", F(x) becomes "0". If "0≦x≦Dth", F(x) monotonously decreases to have "E" as a segment and "E/Dth" as a slope. F(x) is given by:

$$F(x) = E - (E/Dth)x, \text{ when } 0 \leq x \leq Dth = 0, \text{ when } x > Dth \quad (3)$$

$$Py = (\Sigma Pyi)/n \quad (4)$$

$$Px = (\Sigma Pxi)/n \quad (5)$$

where (i=1 to n), and Pyi and Pxi are profiles. For example, G(Px, Py) is given by:

$$G(Px, Py) = \max(Px, Py) \quad (6)$$

In this method, of the pixel value (density value) range of the original image, the pixel value (density value) range in which the pixel values of a low-frequency image are equal to or smaller than Dth is compressed.

As a method similar to the method of Japanese Patent No. 2509503, a method described in "Anan et. al., Japanese Journal of Radiological Technology, Vol. 45, No. 8, August 1989, p. 1030", and Japanese Patent No. 2663189 is known. Using the monotone decreasing function f(x), this method is described by:

$$S_D = S_{org} + f(S_{US}) \quad (7)$$

$$S_{US} = \Sigma S_{org}/M^2 \quad (8)$$

where $S_D$ is the pixel value after processing, $S_{org}$ is the original pixel value, and $S_{US}$ is the average pixel value upon calculating a moving average using a mask size M×M pixels in the original image.

In this method, the low-frequency image generation method is different from that in the method given by equation (2). In the method given by equation (2), a low-frequency image is generated based on one-dimensional data, while in this method, a low-frequency image is generated based on two-dimensional data. In this method as well, of the pixel value (density value) range of the original image, the pixel value (density value) range in which the pixel values of a low-frequency image are equal to or smaller than Dth is compressed.

The aforementioned dynamic range compression method can be expressed using a function f1( ) of converting (compressing) a low-frequency image by:

$$S_D = f1(S_{US}) + (S_{org} - S_{US}) \quad (9)$$

Note that the variable of a function may be omitted for the sake of simplicity in this specification.

The dynamic range compression method given by equation (9) will be explained below. FIGS. 1 and 2 are views for explaining the principle of that method. The uppermost view in FIG. 1 shows the profile of an edge portion of an original image, the middle view shows the profile of a smoothed image of that original image, and the lowermost view shows the profile of a high-frequency image generated by subtracting the smoothed image from the original image. In FIG. 2, the uppermost view shows the profile of an image obtained by multiplying by ½ the absolute values of the smoothed image in the middle view of FIG. 1, the middle view shows the same profile as that of the high-frequency image in FIG. 1, and the lowermost view shows the profile of an image obtained by adding the high-frequency image in the interrupt view to the image in the uppermost view obtained by converting the values of the smoothed image. A process for obtaining an image, the dynamic range of which is compressed, like the image shown in the lowermost view in FIG. 2, is called a dynamic range compression process.

In recent years, multiple-frequency processes (to be also referred to as multiple-frequency transformation processes hereinafter) using Laplacian pyramid transformation and wavelet transformation have been developed. In these multiple-frequency processes, a frequency process (a process for emphasizing or suppressing specific spatial frequency components) of an image is implemented by converting Laplacian coefficients or wavelet coefficients obtained by decomposing an image into a plurality of frequency components.

DISCLOSURE OF INVENTION

When the frequency process of an image is implemented using the aforementioned multiple-frequency transformation process, it is rational and preferable to also implement a dynamic range change process using the multiple-frequency transformation process.

It is an object of the present invention to obtain a high-quality output image by exploiting a tone conversion process and multiple-frequency transformation process, to implement a dynamic range change process using the multiple-frequency transformation process, or to obtain a high-quality output image, the dynamic range or predetermined pixel value range (partial pixel value range) of which has been changed using the tone conversion process and multiple-frequency transformation process.

According to the first aspect of the present invention, there is provided an image processing apparatus comprising tone conversion means for executing tone conversion of an image, and component conversion means for converting frequency components of a plurality of frequency bands of the image or an image after that image has undergone tone conversion by the tone conversion means, on the basis of tone conversion characteristics of the tone conversion means.

According to the second aspect of the present invention, there is provided an image processing apparatus comprising tone conversion means for executing tone conversion of an image, frequency transformation means for decomposing the image that has undergone tone conversion by the tone conversion means into frequency components of a plurality of frequency bands, and component conversion means for converting the frequency components of the plurality of frequency bands obtained by the frequency transformation means, on the basis of tone conversion characteristics of the tone conversion means.

According to the third aspect of the present invention, there is provided an image processing apparatus comprising first frequency transformation means for decomposing an image into first frequency components of a plurality of frequency bands, tone conversion means for executing tone conversion of the image, second frequency transformation means for decomposing the image that has undergone tone conversion by the tone conversion means into second frequency components of a plurality of frequency bands, and component conversion means for converting the second frequency components of the plurality of frequency bands by adding frequency components, which are obtained by converting the first frequency components of the plurality of frequency bands on the basis of tone conversion characteristics of the tone conversion means, to the second frequency components of the plurality of frequency bands.

According to the fourth aspect of the present invention, there is provided an image processing apparatus comprising tone conversion means for executing tone conversion of an image, frequency transformation means for decomposing the image into frequency components of a plurality of frequency bands, component conversion means for converting the frequency components of a plurality of frequency bands obtained by the frequency transformation means, on the basis of tone conversion characteristics of the tone conversion means, inverse frequency transformation means for generating an image by compositing the frequency components converted by the component conversion means, and addition means for adding the image generated by the inverse frequency transformation means and the image that has undergone tone conversion by the tone conversion means.

According to the fifth aspect of the present invention, there is provided an image processing apparatus comprising frequency transformation means for decomposing an image into frequency components of a plurality of frequency bands, component conversion means for converting the frequency components of the plurality of frequency bands obtained by the frequency transformation means, on the basis of predetermined tone conversion characteristics, inverse frequency transformation means for generating an image by compositing the frequency components converted by the component conversion means, and tone conversion means for executing tone conversion of the image generated by the inverse frequency transformation means, on the basis of the predetermined tone conversion characteristics.

According to the sixth aspect of the present invention, there is provided an image processing method comprising the tone conversion step of executing tone conversion of an image, and the component conversion step of converting frequency components of a plurality of frequency bands of the image or an image after that image has undergone tone conversion in the tone conversion step, on the basis of tone conversion characteristics of the tone conversion step.

According to the seventh aspect of the present invention, there is provided an image processing method comprising the tone conversion step of executing tone conversion of an image, the frequency transformation step of decomposing the image that has undergone tone conversion in the tone conversion step into frequency components of a plurality of frequency bands, and the component conversion step of converting the frequency components of the plurality of frequency bands obtained in the frequency transformation step, on the basis of tone conversion characteristics of the tone conversion step.

According to the eighth aspect of the present invention, there is provided an image processing method comprising the first frequency transformation step of decomposing an image into first frequency components of a plurality of frequency bands, the tone conversion step of executing tone conversion of the image, the second frequency transformation step of decomposing the image that has undergone tone conversion in the tone conversion step into second frequency components of a plurality of frequency bands, and the component conversion step of converting the first frequency components of the plurality of second frequency bands by adding frequency components, which are obtained by converting the first frequency components of the plurality of frequency bands on the basis of tone conversion characteristics of the tone conversion step, to the second frequency components of the plurality of frequency bands.

According to the ninth aspect of the present invention, there is provided an image processing method comprising the tone conversion step of executing tone conversion of an image, the frequency transformation step of decomposing the image into frequency components of a plurality of frequency bands, the component conversion step of converting frequency components of the plurality of frequency bands obtained in the frequency transformation step, on the basis of tone conversion characteristics of the tone conversion step, the inverse frequency transformation step of generating an image by compositing the frequency components converted in the component conversion step, and the addition step of adding the image generated in the inverse frequency transformation step and the image that has undergone tone conversion in the tone conversion step.

According to the 10th aspect of the present invention, there is provided an image processing method comprising the frequency transformation step of decomposing an image into frequency components of a plurality of frequency bands, the component conversion step of converting the frequency components of the plurality of frequency bands obtained in the frequency transformation step, on the basis of predetermined tone conversion characteristics, the inverse frequency transformation step of generating an image by compositing the frequency components converted in the component conversion step, and the tone conversion step of executing tone conversion of the image generated in the inverse frequency transformation step, on the basis of the predetermined tone conversion characteristics.

The above and other objects, effects, and features of the present invention will become apparent from the description of embodiments to be described hereinafter with reference to the accompanying drawings.

BEST MODE OF CARRYING OUT THE INVENTION

Embodiment 1

Figure 1:
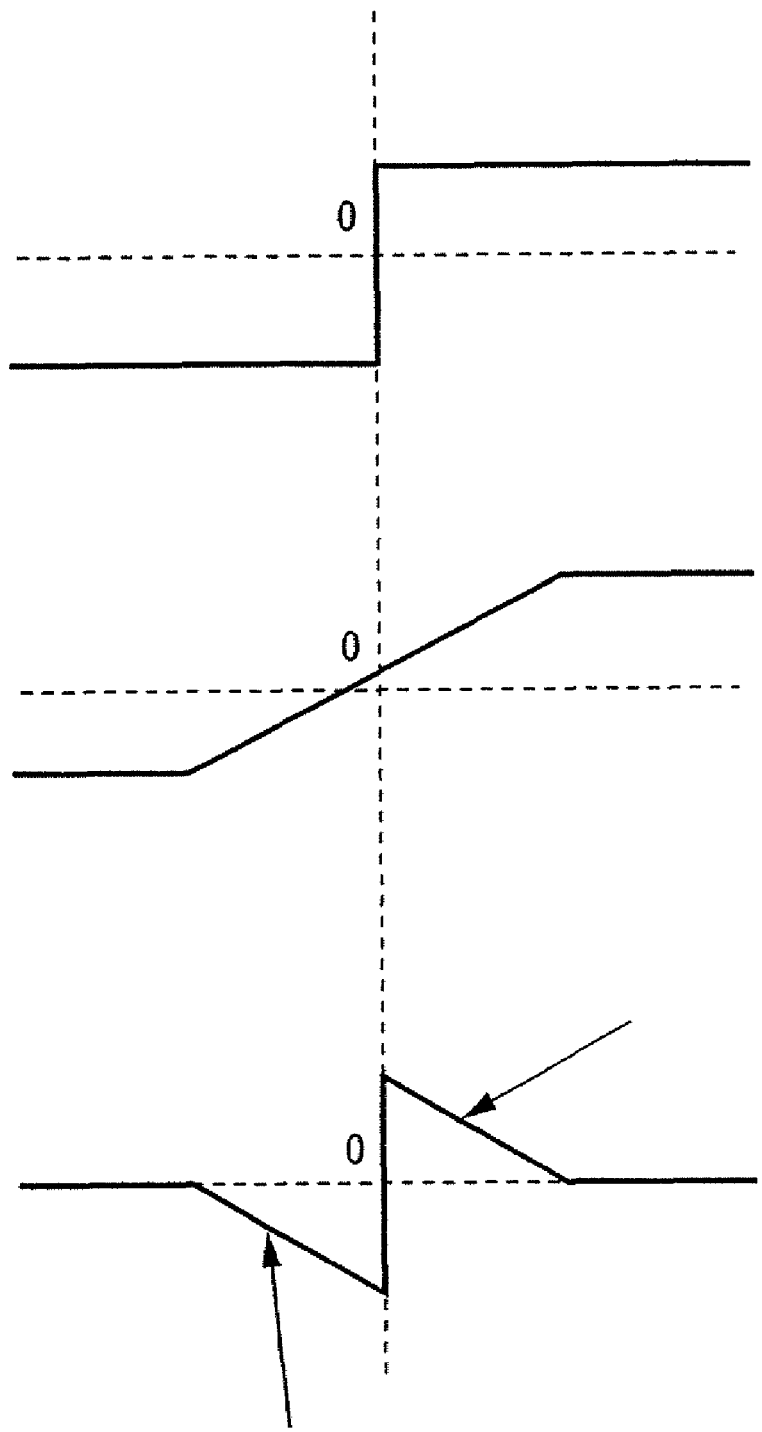
FIG. 1 is a chart for explaining prior art of dynamic range compression.
Figure 2:
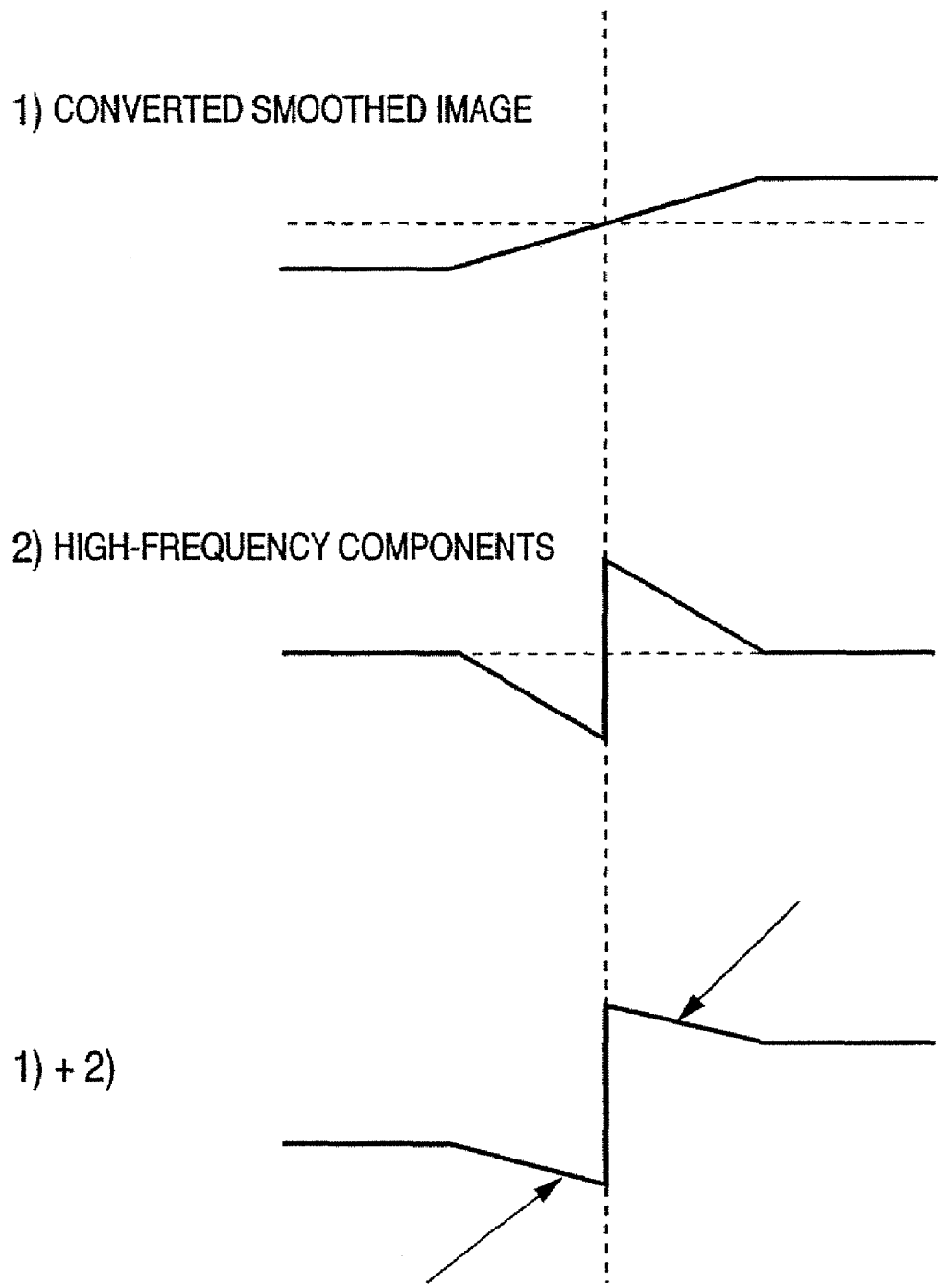
FIG. 2 is a chart for explaining prior art of dynamic range compression.
Figure 3:
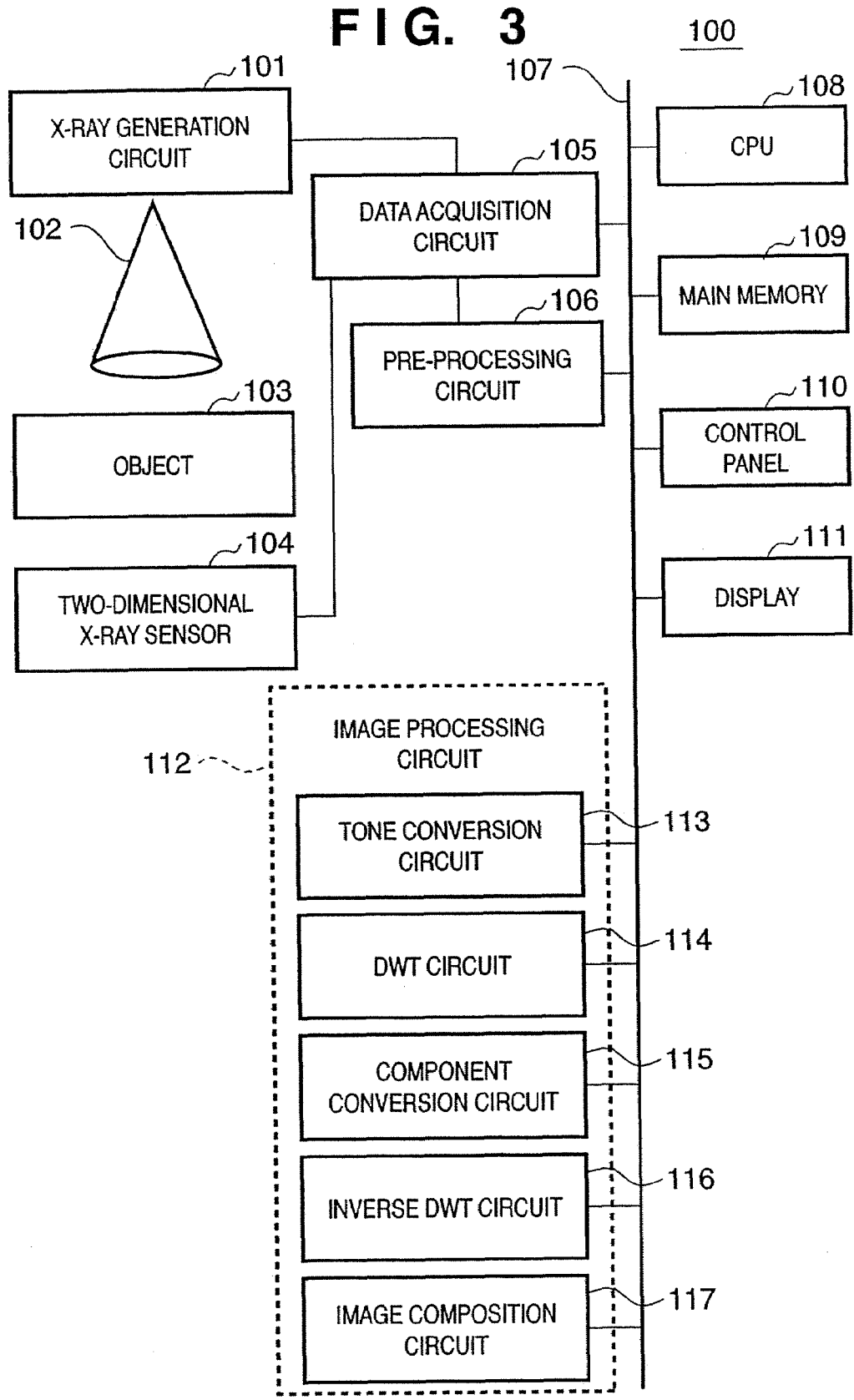
FIG. 3 is a block diagram of an image processing apparatus according to Embodiment 1.

FIG. 3 shows an X-ray photographing apparatus 100 according to Embodiment 1. The X-ray photographing apparatus 100 has a function of executing processes for respective frequency bands of a taken image, and comprises a pre-processing circuit 106, CPU 108, main memory 109, control panel 110, image display 111, and image processing circuit 112, which exchange data via a CPU bus 107.

The X-ray photographing apparatus 100 also comprises a data acquisition circuit 105 connected to the pre-processing circuit 106, and a two-dimensional X-ray sensor 104 and X-ray generation circuit 101, which are connected to the data acquisition circuit 105, and these circuits are also connected to the CPU bus 107.

In the aforementioned X-ray photographing apparatus 100, the main memory 109 stores various data and the like required for the processing by the CPU 108, and includes a work memory for the CPU 108.

The CPU 108 executes operation control and the like of the overall apparatus in accordance with operations at the control panel 110. As a result, the X-ray photographing apparatus 100 operates as follows.

The X-ray generation circuit 101 emits an X-ray beam 102 toward an object 103 to be examined. The X-ray beam 102 emitted by the X-ray generation circuit 101 is transmitted through the object 103 to be examined while being attenuated, and reaches the two-dimensional X-ray sensor 104. The two-dimensional X-ray sensor 104 detects an X-ray image. Assume that the X-ray image is, for example, a human body image or the like in this embodiment.

The data acquisition circuit 105 converts X-ray image information (electrical signal) output from the two-dimensional X-ray sensor 104 into a predetermined electrical signal, and supplies that signal to the pre-processing circuit 106. The pre-processing circuit 106 executes pre-processes such as offset correction, gain correction, and the like for the signal (X-ray image signal) from the data acquisition circuit 105. The X-ray image signal that has undergone the pre-processes by the pre-processing circuit is transferred as an original image to the main memory 109 and image processing circuit 112 via the CPU bus 107 under the control of the CPU 108.

Reference numeral 112 denotes a block diagram showing the arrangement of the image processing circuit. In the image processing circuit 112, reference numeral 113 denotes a tone conversion circuit for performing tone conversion of the original image; 114, a discrete wavelet transformation circuit for computing the discrete wavelet transforms (to be referred to as DWTs hereinafter) of the original image that has undergone the tone conversion by the tone conversion circuit 113 to obtain image components (wavelet transform coefficients) of respective frequency bands; 115, a component conversion circuit for converting the image components of the respective frequency bands obtained by the discrete wavelet transformation circuit 114; and 116, an inverse DWT circuit for computing the inverse discrete wavelet transforms (to be referred to as inverse DWTs hereinafter) on the basis of the image components converted by the component conversion circuit 115.

Figure 4:
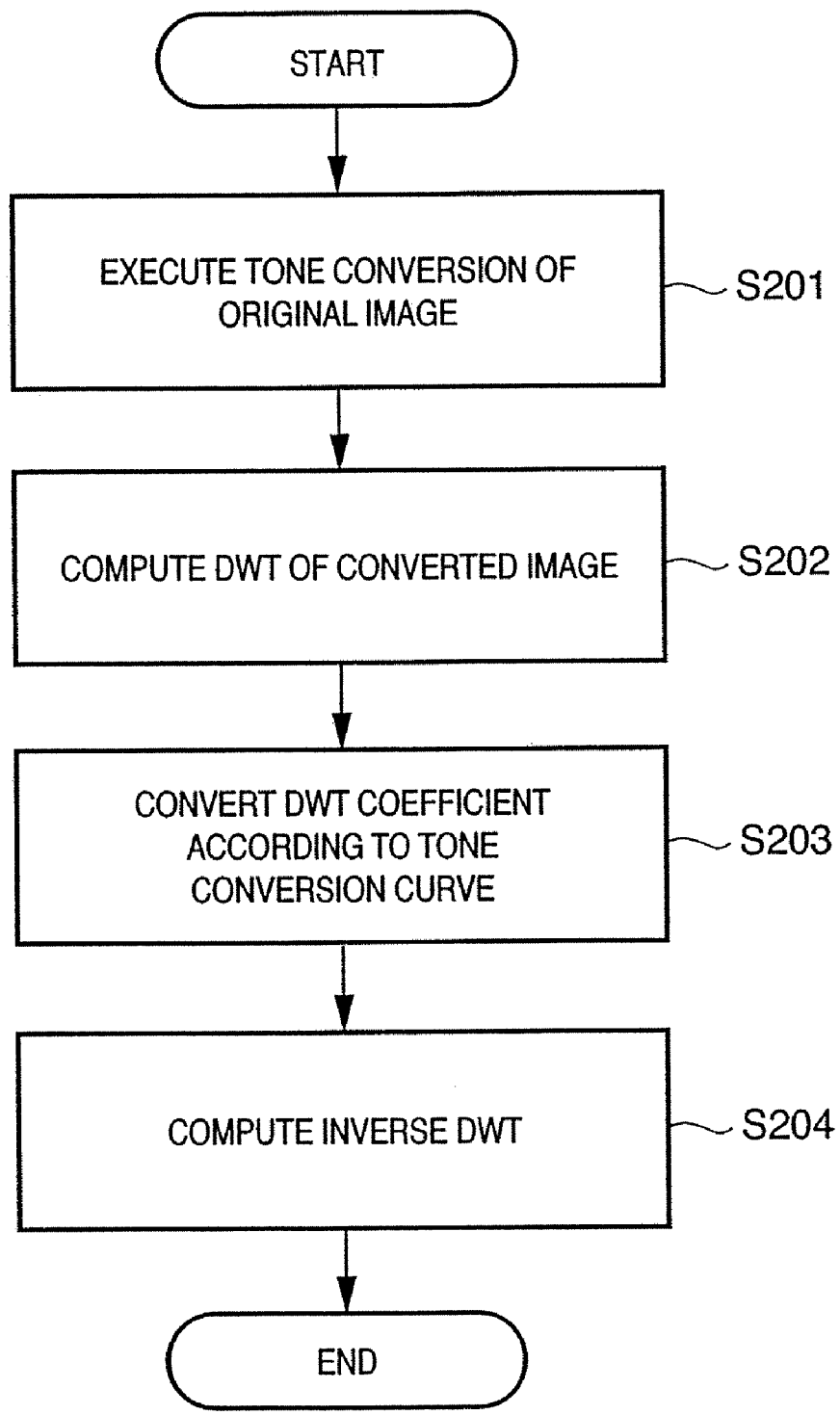
FIG. 4 is a flow chart showing the processing sequence of the image processing apparatus according to Embodiment 1.
Figure 5:
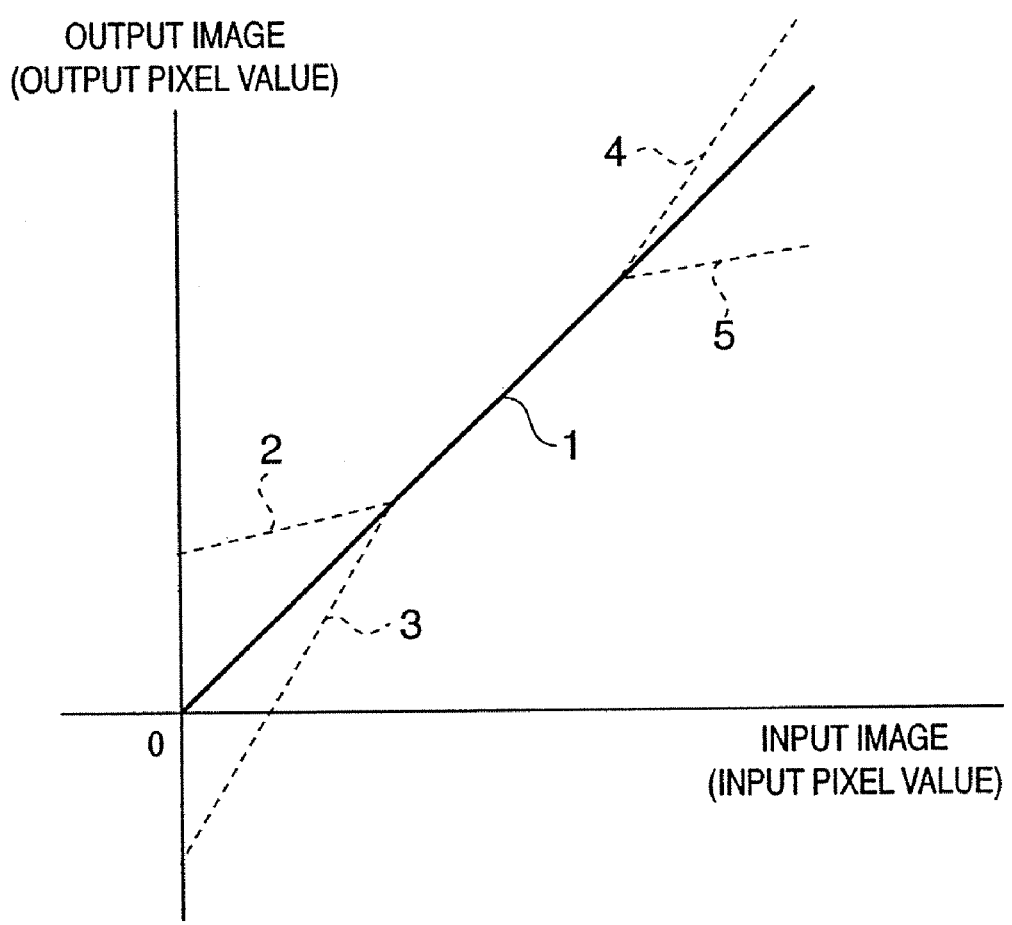
FIG. 5 shows an example of a tone conversion curve used to change the dynamic range.
Figure 6A:
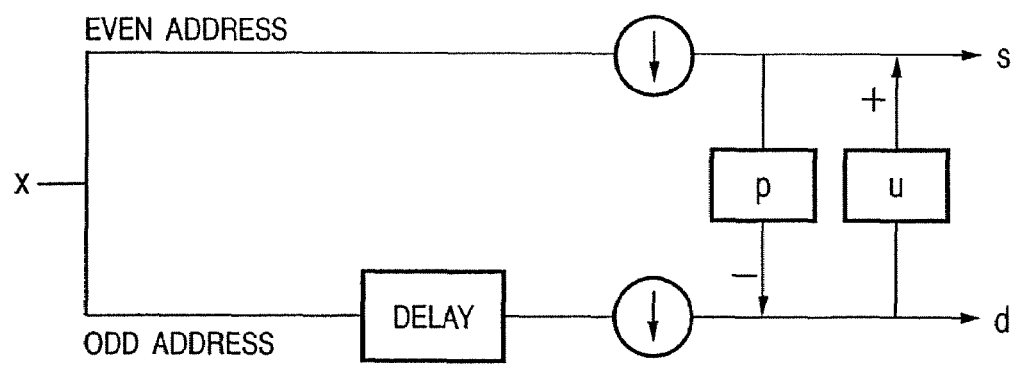
FIGS. 6A to 6C are explanatory views of discrete wavelet transformation and inverse discrete wavelet transformation.
Figure 6B:
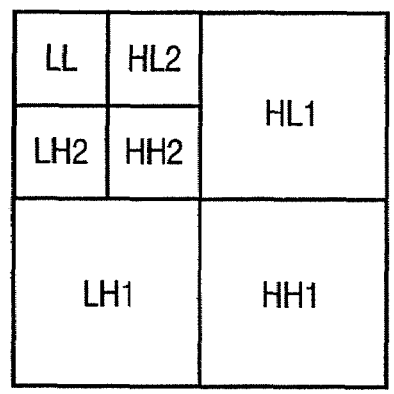
Figure 6C:
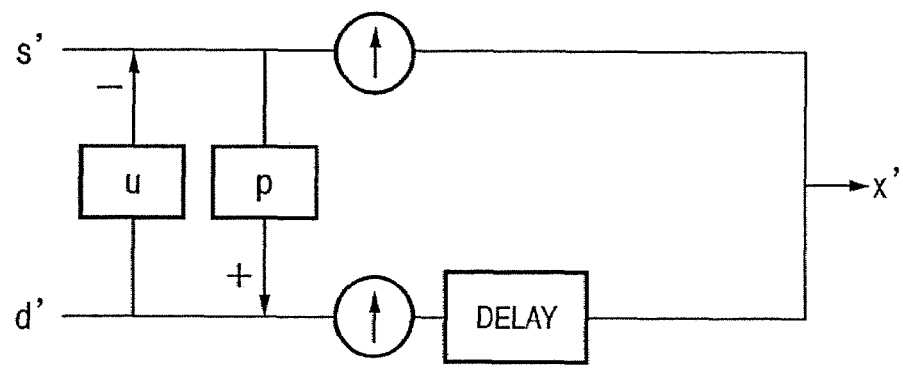
Figure 7:
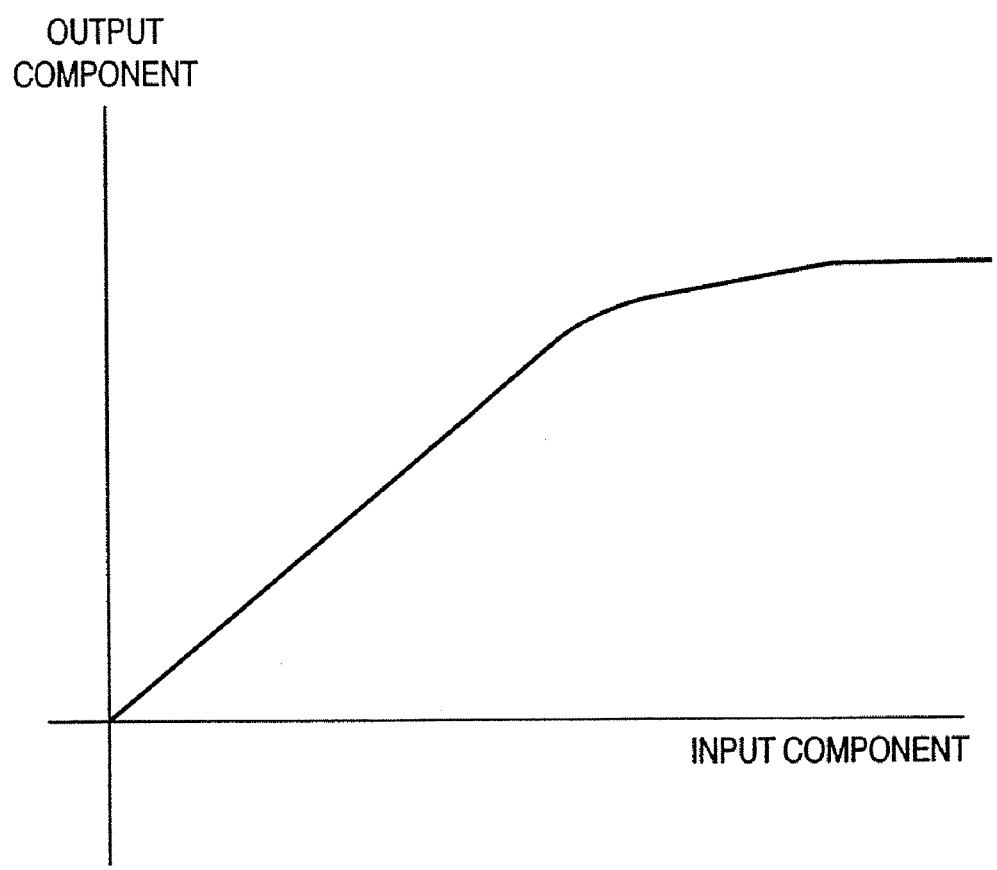
FIG. 7 shows a frequency coefficient conversion curve.
Figure 8:
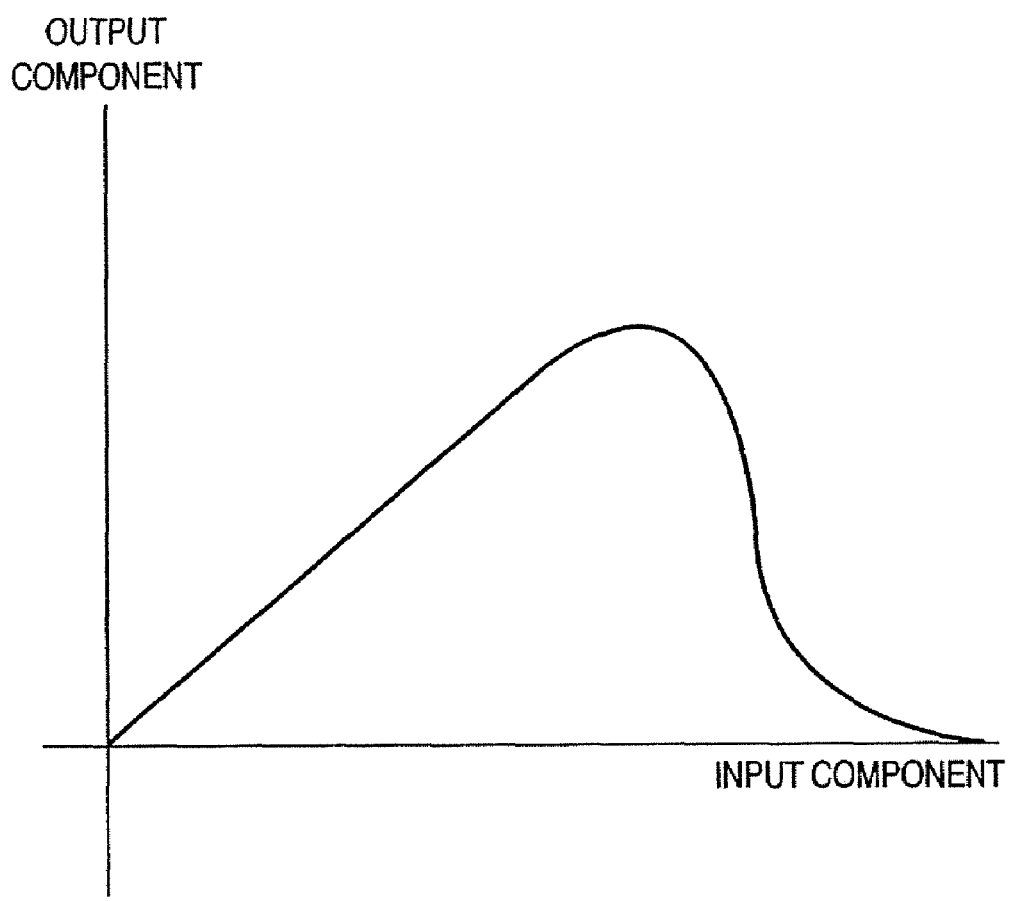
FIG. 8 shows a frequency coefficient conversion curve.

FIG. 4 is a flow chart showing the flow of processes in the image processing circuit 112, FIG. 5 shows an example of a tone conversion curve used to change the dynamic range of image data by the tone conversion circuit 113, FIG. 6A is a circuit diagram showing the arrangement of the DWT circuit 114, FIG. 6B shows an example of the format of transform coefficient groups of two levels obtained by a two-dimensional transformation process, and FIG. 6C is a circuit diagram showing the arrangement of the inverse DWT circuit 116. FIGS. 7 and 8 show examples of function forms used to change image components (DWT coefficients).

The processing in Embodiment 1 will be explained below along with the flow of processes shown in FIG. 4.

An original image that has undergone the pre-processes in the pre-processing circuit 106 is transferred to the image processing circuit 112 via the CPU bus 107.

In the image processing circuit 112, the tone conversion circuit converts an original image Org(x, y) into f(Org(x, y)) using a tone conversion curve f( ) (s201). In this specification, a "curve" may be used synonymously with a "function". Note that x and y are the coordinates on the original image. As the tone conversion curve f( ), for example, a curve form shown in FIG. 5 is used. For example, solid line 1 is a function with slope=1. That is, input and output values are not changed (input and output values are equal to each other), and no dynamic range compression effect is expected. Broken line 2 indicates a function form for compressing the dynamic range on the low pixel value side, and broken line 3 indicates a function form for expanding the dynamic range on the low pixel value side. Likewise, broken line 4 expands the dynamic range on the high pixel value side, and broken line 5 indicates a function form for compressing the dynamic range on the high pixel value side.

In practice, these curve forms are preferably formed to be differential continuous (differentiable and continuous functions). This is because a false edge may be generated when the tone conversion curve includes an undifferentiable or discontinuous point.

The DWT circuit (discrete wavelet transformation circuit) 114 executes a two-dimensional discrete wavelet transformation process of the image f(Org(x, y)) after tone conversion, and calculates and outputs image components (to be also referred to as transform coefficients or frequency coefficients hereinafter). The image data stored in the main memory 109 is sequentially read out and undergoes the transformation process by the DWT circuit 114, and is written in the main memory 109 again. In the DWT circuit 114 of this embodiment, an input image signal is separated into odd and even address signals by a combination of a delay element and down samplers, and undergoes filter processes of two filters p and u. In FIG. 6A, s and d represent low- and high-pass coefficients upon decomposing a linear image signal to one level, and are respectively computed by:

$$d(n)=x(2*n+1)-\text{floor}((x(2*n)+x(2*n+2))/2) \qquad (11)$$

$$s(n)=x(2*n)+\text{floor}((d(n-1)+d(n))/4) \qquad (12)$$

where x(n) is an image signal to be transformed.

With the above process, a linear discrete wavelet transformation process is done for an image signal. Since two-dimensional discrete wavelet transformation is implemented by sequentially executing linear discrete wavelet transformation in the horizontal and vertical directions of an image and its details are known to those who are skilled in the art, a description thereof will be omitted. FIG. 6B shows an example of the format of transform coefficient groups of two levels obtained by the two-dimensional discrete wavelet transformation process. An image signal is decomposed into image components HH1, HL1, LH1, ..., LL in different frequency bands (s202). In FIG. 6B, each of HH1, HL1, LH1, ..., LL (to be referred to as subbands hereinafter) indicates an image component for each frequency band.

The component conversion circuit converts image component hn(x, y) of each subband (S203) by:

$$h2n(x, y)=(1/f'(Org(x, y)))\times hn(x, y) \qquad (13)$$

where h2n(x, y) is the converted image component, and n is the subband category.

With this process, image components after the tone conversion process, which become f'( ) times (f'( ) is the slope of the tone conversion curve f( ) in Org(x, y) corresponding to hn(x, y)) of those of the original image Org(x, y) by the tone conversion process, can be converted into values nearly equal to those of the original image Org(x, y). Note that the image components of the LL subband as the low-frequency component of the lowermost layer are not changed. Hence, the dynamic range of the overall image is changed, but image components corresponding to high-frequency components can maintain values nearly equal to those of the original image. Note that the right-hand side of equation (13) may be multiplied by a predetermined constant. In this case, the high-frequency components of an image can be adjusted (emphasized or suppressed) while changing the dynamic range.

Also, the right-hand side of equation (13) may be multiplied by a predetermined function having a curve form which depends on the pixel values of the original image Org(x, y) or its smoothed image. Such function has a curve form that assumes a small value when the pixel value of the original image Org(x, y) or its smoothed image is equal to or lower than a predetermined pixel value, or assumes a large value when the pixel value is higher than the predetermined pixel value. In such case, for example, the absolute values of high-frequency components in a low pixel value region can be suppressed, and noise components can be made less conspicuous.

The image, the dynamic range of which has been changed by the tone conversion process, does not suffer any artifacts such as overshoot and the like. However, the process given by equation (13) can amplify high-frequency components by changing them, but artifacts such as overshoot and the like may be generated.

To prevent generation of such artifacts, in place of equation (13), it is effective to change high-frequency components by:

$$h2n(x, y)=hn(x, y)+(1/f'(Org(x, y))-1)\times fn(hn(x, y)) \qquad (14)$$

Note that the function fn( ) has a curve form shown in FIG. 7 or 8. In FIGS. 7 and 8, the abscissa plots the input coefficients, and the ordinate plots the output coefficients. FIGS. 7 and 8 show conversion curves when the frequency coefficients are +, and the same conversion is made even when the frequency coefficients are −. That is, FIGS. 7 and 8 show only the first quadrant of an odd function. In this specification, all functions used to convert frequency coefficients (high-frequency components or high-frequency coefficients) are odd functions, and only their first quadrants are shown. These curves are differential continuous (differentiable and continuous functions), and can prevent generation of any false edges. Image components generated at an edge have values larger than normal components, and these curve forms set image components corresponding to edge components to be 0 or suppress them. As a result, in equation (14), when an image component is large, fn(hn(x, y)) becomes 0 or a suppressed value, and h2n(x, y) becomes nearly equal to hn(x, y) or a suppressed value (a value smaller than an image component of the original image). On the other hand, when an image component has a normal value, h2n(x, y) given by equation (14) becomes the same value as equation (13).

In this way, the dynamic range is changed, and effective image components (those equal to or lower than the predetermined value) of the high-frequency components become equal to those of the image before tone conversion. Since image components (those higher than the predetermined value) that cause overshoot of the high-frequency components are not added, i.e., changed, or are added or changed while being suppressed, overshoot or the like can be prevented or suppressed. By setting the slope of the function form fn( ) to be equal to or larger than 1 (or larger than 1) within the range where the input value is equal to or smaller than the predetermined value, high-frequency components can be emphasized while suppressing overshoot. Hence, the dynamic range and high-frequency components can be simultaneously changed while suppressing overshoot and the like.

The inverse DWT circuit 116 computes the inverse discrete wavelet transforms of image components (transform coefficients) converted by the component conversion circuit 115 as follows (s204). The converted image components stored in the main memory 109 are sequentially read out and undergo the inverse transformation process by the inverse discrete wavelet transformation circuit 116, and are written in the main memory 109 again. Assume that the arrangement of the inverse DWT circuit 116 in this embodiment is as shown in FIG. 6C. Input image components undergo filter processes using two filters u and p, and are added to each other after being up-sampled, thus outputting an image signal x'. These processes are described by:

$$x'(2*n)=s'(n)-\text{floor}((d'(n-1)+d'(n))/4) \quad (15)$$

$$x'(2*n+1)=d'(n)+\text{floor}((x'(2*n)+x'(2*n+2))/2) \quad (16)$$

With the above process, linear inverse discrete wavelet transformation of transform coefficients is done. Since two-dimensional inverse discrete wavelet transformation is implemented by sequentially executing linear inverse transformation in the horizontal and vertical directions of an image and its details are known to those who are skilled in the art, a description thereof will be omitted.

As described above, since the dynamic range change process is implemented by exploiting the multiple-frequency transformation process, and high-frequency components are adjusted in correspondence with tone conversion used to change the dynamic range, a high-quality output image, the dynamic range of which has been changed, can be obtained. Also, the dynamic range of an image can be changed, and high-frequency components can be changed at the same time, while suppressing artifacts such as overshoot and the like. In this manner, a dynamic range change process such as dynamic range compression or the like and a sharpening process for each frequency band by changing frequency components for each frequency band can be simultaneously executed.

Embodiment 2

Figure 9:
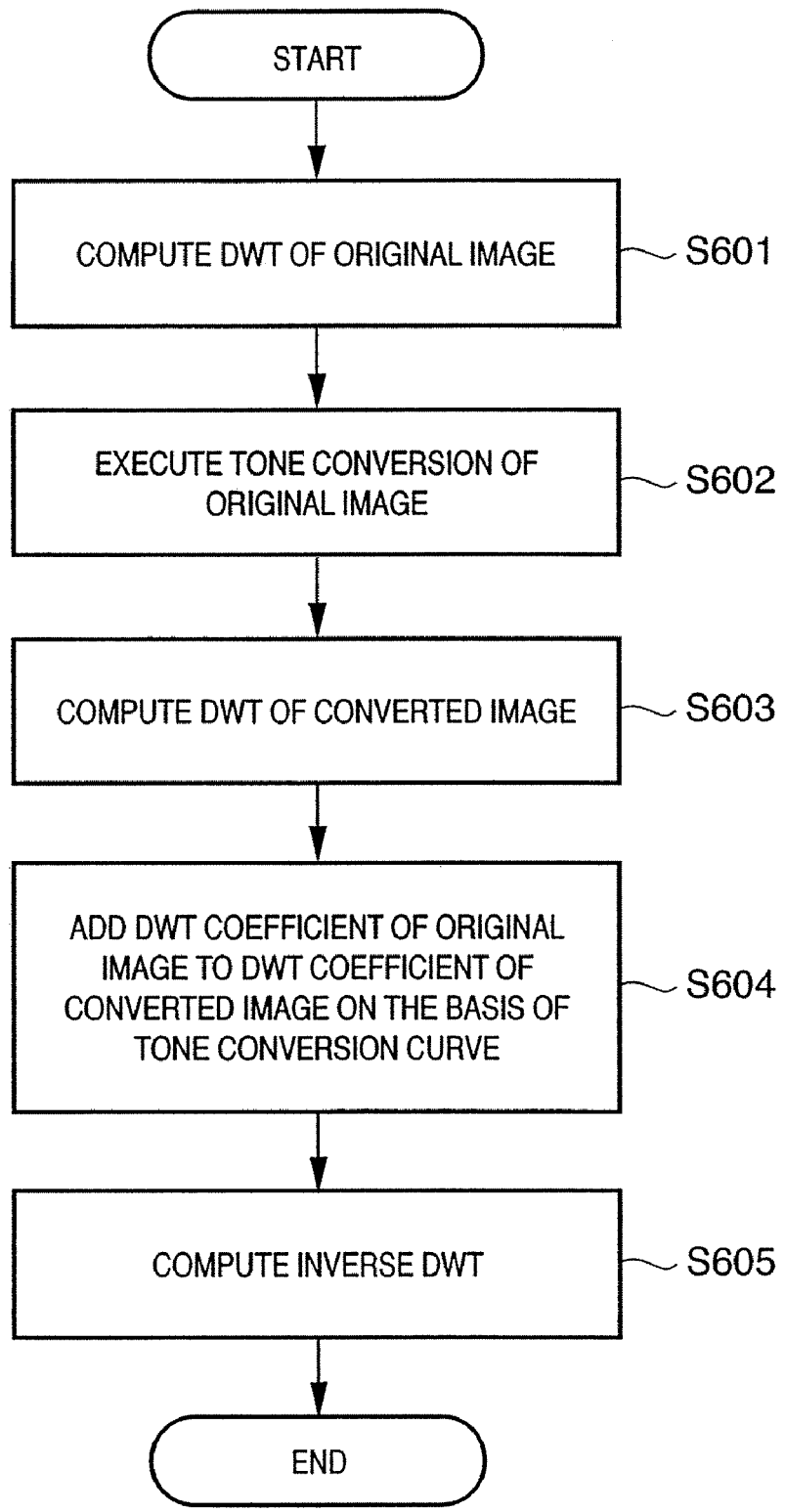
FIG. 9 is a flow chart showing the processing sequence of the image processing apparatus according to Embodiment 2.

Embodiment 2 will be described below along with the flow of processes shown in FIG. 9. A description of the same processes as those in Embodiment 1 will be omitted.

The DWT circuit 114 executes a DWT process of an original image Org(x, y). Let horgn(x, y) be each image component obtained by that process (s601) The tone conversion circuit 113 executes a tone conversion process of the original image Org(x, y) using a tone conversion curve f( ) (s602). The DWT circuit 114 executes a DWT process of the image f(Org (x, y)) that has undergone the tone conversion process to obtain image components hn(x, y) (s603). Note that n indicates the subband category and x and y are the coordinates as in Embodiment 1.

The component conversion circuit 115 adds image component horgn(x, y) to the image component hn(x, y) to obtain a new image component h2n(x, y) (s604) by:

$$h2n(x, y)=hn(x, y)+(1-f'(\text{Org}(x, y)))\times\text{horgn}(x, y) \quad (17)$$

Note that the image components of the LL subband as the low-frequency component of the lowermost layer are not changed. In this manner, the magnitudes of high-frequency components of the image, the dynamic range of which has been changed can be maintained to be nearly equal to those of high-frequency components of the original image. In this case, since the high-frequency components are added using those of the original image, the magnitudes of the high-frequency components can accurately come closer to those of the high-frequency components of the original image. Note that the second term of the right-hand side of equation (17) may be multiplied by a predetermined constant. In this case, the high-frequency components of the image can be adjusted (emphasized or suppressed) while changing the dynamic range.

Note that equation (18) may be used in place of equation (17) to obtain the same effect:

$$h2n(x, y)=\text{horgn}(x, y) \quad (18)$$

Also, the right-hand side of equation (17) may be multiplied by a predetermined function having a curve form which depends on the pixel values of the original image Org(x, y) or its smoothed image. Such function has a curve form that assumes a small value when the pixel value of the original image Org(x, y) or its smoothed image is equal to or lower than a predetermined pixel value, or assumes a large value when the pixel value is higher than the predetermined pixel value.

The image, the entire dynamic range of which has been changed by the tone conversion process, does not suffer any artifacts such as overshoot and the like. However, the process given by equation (17) can amplify high-frequency components by adding those of the original image, but simultaneously adds components of the original image which may cause artifacts such as overshoot and the like. Hence, overshoot may occur.

To prevent this, in place of equation (17), it is effective to change high-frequency components by:

$$h2n(x, y)=hn(x, y)+(1-f'(\text{Org}(x, y)))\times fn(\text{horgn}(x, y)) \quad (19)$$

Note that the function fn( ) has a curve form shown in FIG. 7 or 8. Image components generated at an edge have values larger than normal components, and these curve forms set image components corresponding to edge components to 0 or suppress them. As a result, in equation (19), when an image component is large, fn(horgn(x, y)) becomes 0 or a suppressed value, and h2n(x, y) becomes nearly equal to hn(x, y) or a suppressed value smaller than horgn(x, y). On the other hand, when an image component has a normal value, h2n(x, y) becomes the same value as equation (17).

In this way, the dynamic range is changed, and effective image components (those equal to or lower than the predetermined value) of the high-frequency components become nearly equal to those of the image before tone conversion. Since image components (those higher than the predetermined value) that cause overshoot of the high-frequency components are not added, i.e., changed, or are added or changed while being suppressed, overshoot or the like can be prevented or suppressed. By setting the slope of the function form fn( ) to be equal to or larger than 1 (or larger than 1) within the range where the input value is equal to or smaller than the predetermined value, high-frequency components can be emphasized while suppressing overshoot. Hence, the dynamic range and high-frequency components can be changed at the same time while suppressing overshoot and the like.

The inverse DWT circuit 116 executes an inverse DWT process based on the image components changed by the component change circuit 115 (S605).

In Embodiment 2, since the dynamic range change process is implemented by exploiting the multiple-frequency process, and high-frequency components are adjusted in correspondence with tone conversion used to change the dynamic range, a high-quality image, the dynamic range of which has been changed, can be obtained. Furthermore, since high-frequency components of the original image are used as those to be added, high-frequency components of the processed image can accurately come closer to those of the original image. Also, the dynamic range and high-frequency components can be changed at the same time while suppressing artifacts such as overshoot and the like. In this manner, a dynamic range change process such as dynamic range compression or the like and a sharpening process for each frequency band by changing frequency components for each frequency band can be simultaneously executed to obtain a high-quality output image.

Embodiment 3

Figure 10:
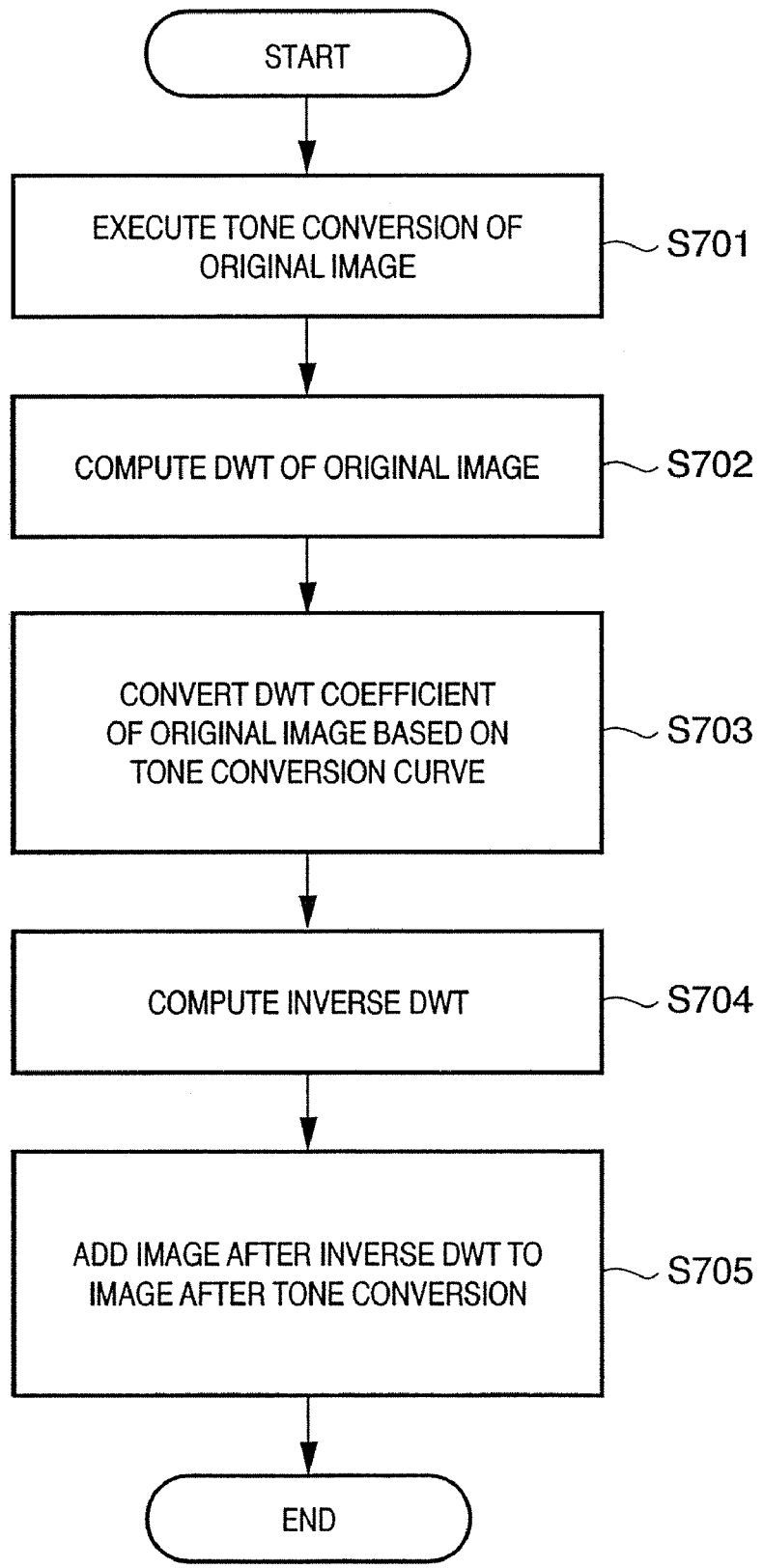
FIG. 10 is a flow chart showing the processing sequence of the image processing apparatus according to Embodiment 3.

Embodiment 3 will be described along with the flow of processes shown in FIG. 10. A description of the same processes as those in Embodiment 1 will be omitted.

The tone conversion circuit 113 executes a tone conversion process of an original image Org(x, y) using a tone conversion curve f( ) to obtain a processed image f(Org(x, y) (s701). The DWT circuit 114 then executes a DWT process of the original image to obtain image components hn(x, y) (s702). Note that n indicates the subband category and x and y are the coordinates as in Embodiment 1.

The component conversion circuit 115 converts each image component hn(x, y) by:

$$h2n(x, y)=(1-f'(\text{Org}(x, y)))\times hn(x, y) \quad (20)$$

to obtain a new image component h2n(x, y) (s703).

Furthermore, the values of the lowest frequency component LL are set to be all 0s (zeros).

In this way, upon restoring an image from h2n(x, y), an image Hr(x, y) consisting of only high-frequency components depending on the slope of the tone conversion curve can be obtained. Note that the right-hand side of equation (20) may be multiplied by a predetermined constant. In this case, the high-frequency components of the image can be adjusted (emphasized or suppressed) while changing the dynamic range.

Also, the right-hand side of equation (20) may be multiplied by a predetermined function having a curve form which depends on the pixel values of the original image Org(x, y) or its smoothed image. Such function has a curve form that assumes a small value when the pixel value of the original image Org(x, y) or its smoothed image is equal to or lower than a predetermined pixel value, or assumes a large value when the pixel value is higher than the predetermined pixel value.

The inverse DWT circuit 116 computes the inverse DWTs based on the components converted by the component conversion circuit 115 to obtain a restored image Hr(x, y) (s704). The image f(Org(x, y) obtained by the tone conversion circuit 113 is added to the image Hr(x, y) obtained by the inverse DWT circuit 116 by:

$$\text{Prc}(x, y)=f(\text{Org}(x, y))+Hr(x, y) \quad (21)$$

to obtain a processed image Prc(x, y) (s705).

The image, the dynamic range of which has been changed by the tone conversion process, does not suffer any artifacts such as overshoot and the like. However, the high-frequency components obtained by equation (20) contain components of the original image which may cause artifacts such as overshoot and the like. Therefore, an image obtained by inversely transforming such image components contains components which may cause overshoot, and if that image is added, overshoot may occur.

To prevent this, in place of equation (20), it is effective to change high-frequency components by:

$$h2n(x, y)=(1-f'(\text{Org}(x, y)))\times fn(hn(x, y)) \quad (22)$$

Note that the function fn( ) has a curve form shown in FIG. 7 or 8. In image components (high-frequency components), those generated at an edge have values larger than normal components, and these curve forms set image components corresponding to edge components to 0 or suppress them. As a result, in equation (22), when an image component is large, since fn(hn(x, y)) becomes 0 or a suppressed value, h2n(x, y) also becomes 0 or a suppressed value. On the other hand, when an image component has a normal value, h2n(x, y) becomes the same value as equation (20).

By adding the image obtained by computing the inverse DWTs of the image components given by equation (20) or (22) to the image that has undergone the tone conversion, an image, the dynamic range of which has been changed, but the high-frequency components of which have magnitudes nearly equal to those of the original image, can be obtained.

Furthermore, since the image components are changed in correspondence with the magnitudes of image components as in equation (22), effective image components (those equal to or lower than the predetermined value) of the high-frequency components become nearly equal to those of the image before tone conversion. Since image components (those higher than the predetermined value) that cause overshoot of the high-frequency components are not added, i.e., changed, or are added or changed while being suppressed, overshoot or the like can be prevented or suppressed. By setting the slope of the function form fn( ) to be equal to or larger than 1 (or larger than 1) within the range where the input value is equal to or smaller than the predetermined value, high-frequency components can be emphasized while suppressing overshoot. Hence, the dynamic range and high-frequency components can be changed at the same time while suppressing overshoot and the like.

In Embodiment 3, since the dynamic range change process is implemented by exploiting the multiple-frequency process, and high-frequency components are adjusted in correspondence with tone conversion used to change the dynamic range, a high-quality image, the dynamic range of which has been changed, can be obtained. Furthermore, since high-frequency components of the original image are used as those to be added, high-frequency components of the processed image can accurately come closer to those of the original image. Also, since the DWT process need be done only once, the computation time can be shortened. Moreover, the dynamic range and high-frequency components can be changed at the same time while suppressing artifacts such as overshoot and the like. In this manner, a dynamic range change process such as dynamic range compression or the like and a sharpening process for each frequency band by changing frequency components for each frequency band can be simultaneously executed to obtain a high-quality output image.

Embodiment 4

Figure 11:
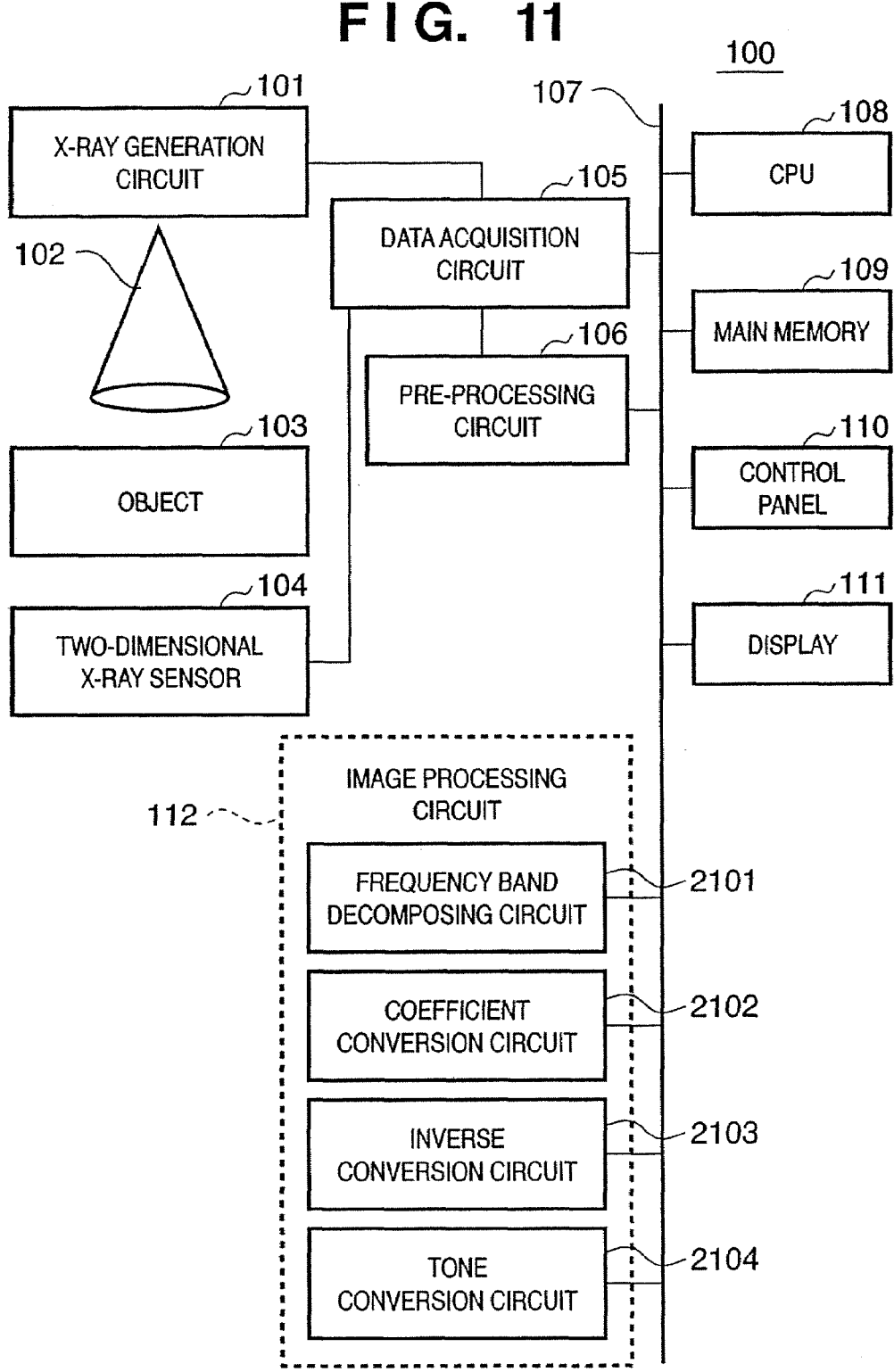
FIG. 11 is a block diagram of an image processing apparatus according to Embodiment 4.

Embodiment 4 relates to an image process for obtaining the effects of the dynamic range change and frequency processes while preserving the edge structure. FIG. 11 is a block diagram showing the arrangement of Embodiment 4, and a description of the same processes as in Embodiment 1 will be omitted.

Referring to FIG. 11, reference numeral 112 denotes an image processing circuit; 2101, a frequency band decomposing circuit for decomposing an original image into a plurality of frequency bands by wavelet transformation, Laplacian pyramid transformation, or the like to obtain frequency coefficients; 2102, a coefficient conversion circuit for converting the coefficients on the basis of the slope of a tone conversion curve used later to change the dynamic range; 2103, an inverse conversion circuit for inversely converting the coefficients obtained by conversion by the coefficient conversion circuit 2102; and 2104, a tone conversion circuit for changing the dynamic range of the image, obtained by inverse conversion by the inverse conversion circuit 2103.

Figure 12:
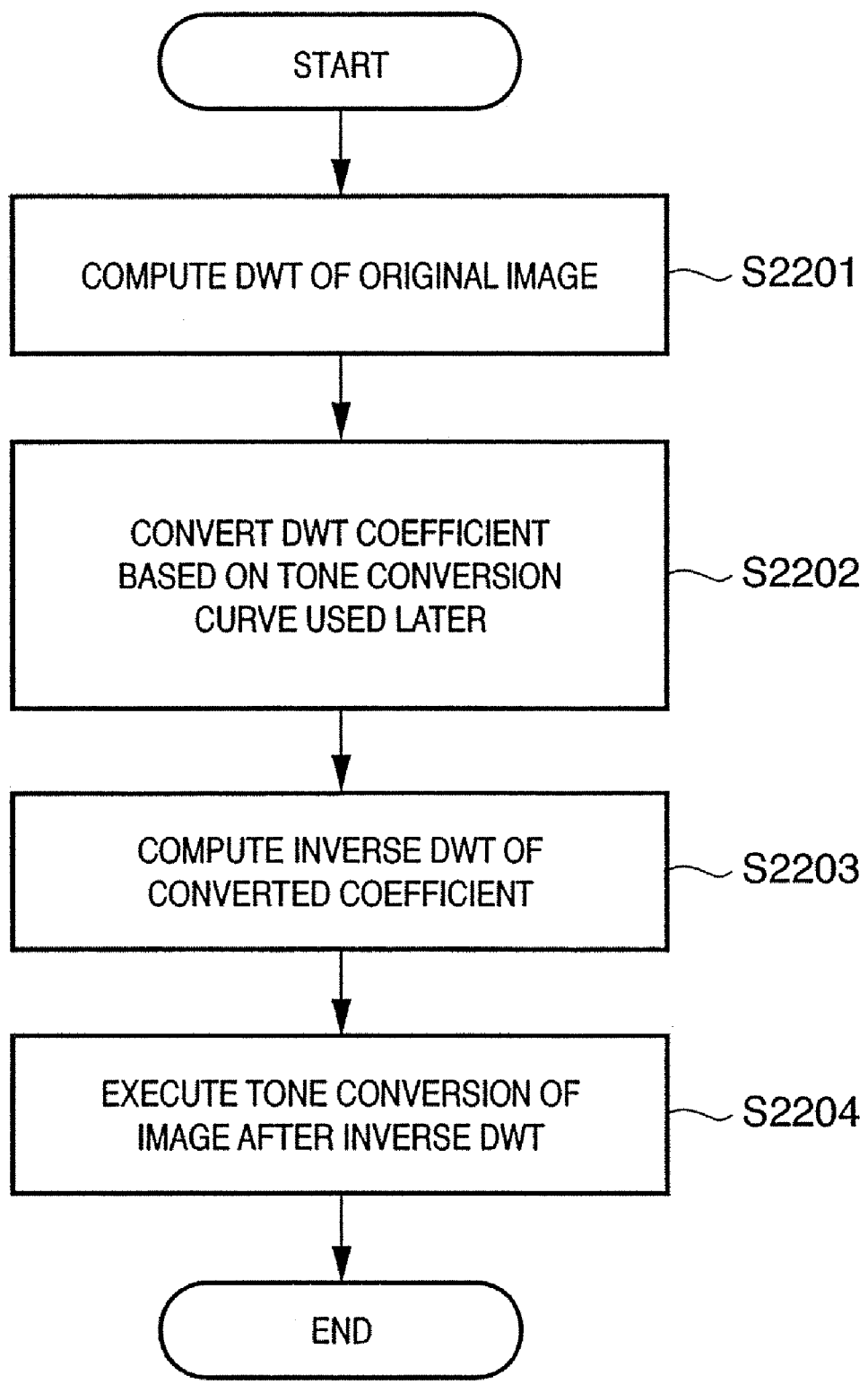
FIG. 12 is a flow chart showing the processing sequence of the image processing apparatus according to Embodiment 4.
Figure 13:
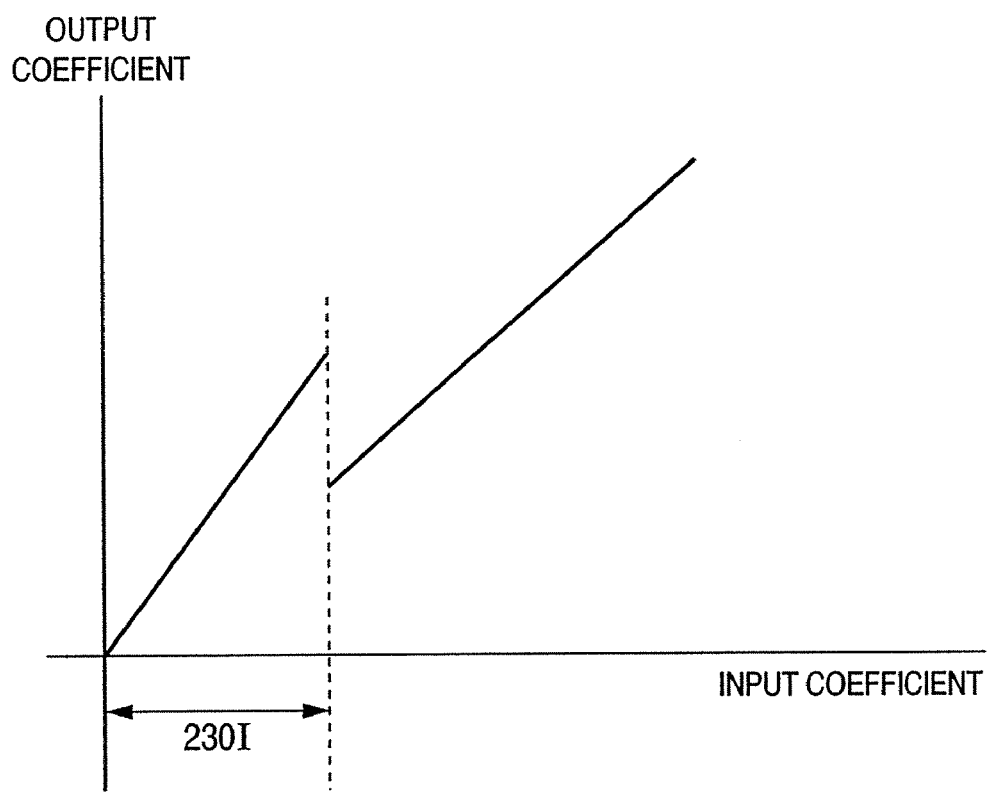
FIG. 13 shows a curve used to convert frequency coefficients.

FIG. 12 is a flow chart showing the flow of processes of the image processing circuit 112 according to Embodiment 4 of the present invention. FIG. 13 shows an example of the coefficient conversion curve used in the coefficient conversion circuit 2102. In FIG. 13, the abscissa plots input coefficients, and the ordinate plots output coefficients.

Embodiment 4 will be described below along with the flow of processes shown in FIG. 12. The frequency band decomposing circuit 2101 executes a two-dimensional discrete wavelet transformation process of an original image f(x, y), and outputs frequency coefficients (s2201). The frequency coefficient decomposing method may be any method of wavelet transformation, Laplacian pyramid transformation, and the like. In this embodiment, the image is decomposed into frequency coefficients HH1, HL1, LH1, . . . , LL for respective frequency bands using two-dimensional discrete wavelet transformation.

The coefficient conversion circuit 2102 converts the frequency coefficients in accordance with a tone conversion curve (e.g., a conversion curve shown in FIG. 5) Fo used in the tone conversion circuit 2104 (s2202). In this case, only coefficients in a region 2301 equal to or lower than a predetermined absolute value (threshold value) are converted, and those higher than the predetermined absolute value remain unchanged, as shown in FIG. 13. This predetermined absolute value is determined by experiments depending on the magnitudes of coefficients with respect to the edge of an image. The edge structure can be preserved when coefficients higher than the predetermined absolute value remain unchanged, and artifacts such as overshoot and the like can be suppressed in a reconstructed image.

Assume that hn(x, y) are frequency coefficients of n levels, i.e., coefficients of a region 2301 equal to or lower than a predetermined absolute value, and h2n(x, y) are coefficient values after hn(x, y) have undergone coefficient conversion by:

$$h2n(x, y) = f5(f(x, y)) \times (1/F'(x, y)) \times hn(x, y) \quad (23)$$

Note that the function f5( ) has a curve form which depends on the pixel values of the original image f(x, y) or its smoothed image, for example, a curve form that assumes a small value when the pixel value of the original image f(x, y) or its smoothed image is equal to or lower than a predetermined pixel value, or assumes a large value when the pixel value is higher than the predetermined pixel value. Note that a conversion curve F2( ) in FIG. 13 expresses the above process, and the coefficients of the region 2301 are not always linearly converted but are converted based on equation (23). Therefore, the conversion curve F2( ) can also be expressed by:

$$F2(hn(x, y)) = h2n(x, y) = f5(f(x, y)) \times (1/F'(x, y)) \times hn(x, y), \text{ when } hn(x, y) \leq \text{ predetermined threshold value}$$
$$= hn(x, y), \text{ when } hn(x, y) > \text{ predetermined threshold value} \quad (23)'$$

The inverse conversion circuit 2103 inversely converts h2n (x, y) (inverse DWT) (S2203). A restored image f2(x, y) is then obtained. The tone conversion circuit 2104 executes tone conversion of the restored image f2(x, y) by:

$$f3(x, y) = F(f2(x, y)) \quad (24)$$

to obtain an image f3(x, y), the dynamic range of which has been changed (s2204).

As described above, according to Embodiment 4, since the frequency coefficients are changed in advance on the basis of a curve form of tone conversion used to change the dynamic range, the magnitudes of high-frequency components in an image, the dynamic range of which has been changed, can be maintained nearly equal to those of high-frequency components of the original image. Since coefficient values within the predetermined absolute value range are not changed, the edge structure can be preserved, and overshoot and the like can be suppressed even in an image which has undergone the frequency process and dynamic range change process.

In FIG. 13, the conversion function F2( ) has an undifferentiable and discontinuous point, but no artifacts such as false edges or the like appear in the inversely converted image. This is because no structure which is visually recognized as a continuous boundary such as a line or the like appears on the inversely converted image since coefficients having the predetermined absolute value (those corresponding to the undifferentiable and discontinuous point of the conversion curve) are randomly distributed in the coefficient domain. That is, the wavelet coefficients are frequency coefficients, and a predetermined image domain is restored by the inverse wavelet transformation process in correspondence with the magnitudes of frequency components. Note that frequency coefficients of the predetermined absolute value may often be arranged continuously in correspondence with the edge portion of an image in the coefficient domain. In such case, since a continuous structure in the coefficient domain, which appears after coefficient conversion using a discontinuous function like the conversion function F2( ), appears as a continuous structure along the edge portion even on the restored image, it is not recognized as a false edge.

Since the original image is decomposed into multiple-frequency coefficients, a noise suppression process, a sharpening process, or a hybrid process with other processes can be easily done. For example, in the noise suppression process or the like, an analysis process or the like based on coefficients upon decomposing the original image into multiple-frequency coefficients is done, and predetermined frequency coefficients are converted based on the analysis result or the like.

Another Embodiment

The scope of the present invention includes a case wherein the functions of the embodiments are implemented by supplying a program code of software that implements the functions of the embodiments to a computer (or a CPU or MPU) in an apparatus or system connected to various devices, and making the computer in the system or apparatus operate the various devices in accordance with the stored program, so as to operate the various devices for the purpose of implementing the functions of the embodiments.

In this case, the program code itself read out from the storage medium implements the functions of the embodiments, and the program code itself, and means for supplying the program code to the computer (i.e., a storage medium which stores the program code) constitutes the present invention.

As the storage medium for storing such program code, for example, a floppy disk, hard disk, optical disk, magneto-optical disk, CD-ROM, magnetic tape, nonvolatile memory card, ROM, and the like may be used.

The program code also constitutes the present invention not only when the functions of the embodiments are implemented by executing the supplied program code by the computer but also when the functions of the embodiments are implemented by collaboration of the program code and an OS (operating system) or another application software running on the computer.

Furthermore, the program code constitutes the present invention when the functions of the embodiments are implemented by some or all of actual processes executed by a CPU or the like arranged in a function extension board or a function extension unit, which is inserted in or connected to the computer, after the supplied program code is written in a memory of the extension board or unit.

As described above, according to the above embodiments, since tone conversion and conversion of frequency components based on it are made using the tone conversion process and multiple-frequency transformation process, a high-quality output image can be obtained.

When the dynamic range or predetermined pixel value range of an image is changed by tone conversion, and high-frequency components are converted based on the slope of the tone conversion curve, a high-quality output image, the dynamic range or predetermined pixel value range of which has been changed, can be obtained.

The invention claimed is:

1. An image processing apparatus comprising:
a frequency transformation unit arranged to decompose an original image into frequency components of a plurality of high frequency bands and one low frequency band;
a component conversion unit arranged to convert the frequency components of the plurality of high frequency bands based on a slope of a tone conversion curve, wherein the component conversion unit sets threshold values, determined based on the coefficients forming an edge of the original image, each threshold value corresponding to a respective one of the plurality of frequency bands and the low frequency band, and converts a said frequency component whose value is less than the corresponding threshold value;
an inverse frequency transformation unit arranged to generate an image based on the converted frequency components; and
a tone conversion unit arranged to execute tone conversion of the generated image based on the tone conversion curve.

2. The apparatus according to claim 1, wherein the component conversion unit converts a said frequency component of a lowest frequency band to zero.

3. The apparatus according to claim 1, wherein the component conversion unit does not convert a frequency component of a lowest frequency band.

4. The apparatus according to claim 1, further comprising:
an X-ray generator arranged to emit X-rays to an object; and
a two-dimensional X-ray sensor arranged to convert X-rays transmitted through the object,
wherein the original image is captured by the two-dimensional X-ray sensor.

5. The apparatus according to claim 1, wherein the slope of the tone conversion curve is a derivative value of the tone conversion curve.

6. An image processing method comprising:
a frequency transformation step of decomposing an original image into frequency components of a plurality of high frequency bands and one low frequency band;
a component conversion step of converting the frequency components of the plurality of high frequency bands based on a slope of a tone conversion curve, wherein the component conversion step sets threshold values, determined based on the coefficients forming an edge of the original image, each threshold value corresponding to a respective one of the plurality of frequency bands and the low frequency band, and converts a said frequency component whose value is less than the corresponding threshold value;
an inverse frequency transformation step of generating an image based on the converted frequency components; and
a tone conversion unit arranged to execute tone conversion of the generated image based on the tone conversion curve.

7. The method according to claim 6, wherein the slope of the tone conversion curve is a derivative value of the tone conversion curve.

8. A computer-readable medium encoded with a computer program for a method of processing an image, the method comprising:
a frequency transformation step of decomposing an original image into frequency components of a plurality of high frequency bands and one low frequency band;
a component conversion step of converting the frequency components of the plurality of high frequency bands based on a slope of a tone conversion curve, wherein the component conversion step sets threshold values, determined based on the coefficients forming an edge of the original image, each threshold value corresponding to a respective one of the plurality of frequency bands and the low frequency band, and converts a said frequency component whose value is less than the corresponding threshold value;
an inverse frequency transformation step of generating an image based on the converted frequency components; and
a tone conversion unit arranged to execute tone conversion of the generated image based on the tone conversion curve.

9. The medium according to claim 8, wherein the slope of the tone conversion curve is a derivative value of the tone conversion curve.

10. An image processing apparatus comprising:
a frequency transformation unit arranged to decompose an original image into frequency components of a plurality of high frequency bands and one low frequency band;
a component conversion unit arranged to convert the frequency components of the plurality of high frequency bands based on a derivative value of a tone conversion curve, wherein the component conversion unit sets threshold values, determined based on the coefficients forming an edge of the original image, each threshold value corresponding to a respective one of the plurality of frequency bands and the low frequency band, and converts a said frequency component whose value is less than the corresponding threshold value;
an inverse frequency transformation unit arranged to generate an image based on the converted frequency components; and
a tone conversion unit arranged to execute tone conversion of the generated image based on the tone conversion curve.

* * * * *